(12) United States Patent
Yuyama et al.

(10) Patent No.: US 11,763,837 B2
(45) Date of Patent: *Sep. 19, 2023

(54) DATA PROCESSING DEVICE AND DATA PROCESSING METHOD

(71) Applicant: YAMAHA CORPORATION, Hamamatsu (JP)

(72) Inventors: Yuta Yuyama, Hamamatsu (JP); Kunihiro Kumagai, Hamamatsu (JP); Ryotaro Aoki, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 177 days.

This patent is subject to a terminal disclaimer.

(21) Appl. No.: 17/226,498

(22) Filed: Apr. 9, 2021

(65) Prior Publication Data

US 2021/0225390 A1 Jul. 22, 2021

Related U.S. Application Data

(63) Continuation of application No. 16/418,164, filed on May 21, 2019, now Pat. No. 11,004,460.

(30) Foreign Application Priority Data

May 25, 2018 (JP) ................................ 2018-100429

(51) Int. Cl.
*G10L 25/51* (2013.01)
*H04N 5/14* (2006.01)
(Continued)

(52) U.S. Cl.
CPC .............. *G10L 25/51* (2013.01); *H04N 5/147* (2013.01); *H04N 21/4394* (2013.01); *H04N 21/4852* (2013.01)

(58) Field of Classification Search
CPC ........... H04N 21/4394; H04N 21/4852; H04N 5/147; H04N 21/44008
See application file for complete search history.

(56) References Cited

U.S. PATENT DOCUMENTS 8,473,291 B2 6/2013 Matsuo
9,542,938 B2 1/2017 Xue
(Continued)

FOREIGN PATENT DOCUMENTS

CN 101388216 A 3/2009
CN 103927146 A 7/2014
(Continued)

OTHER PUBLICATIONS

Extended European Search Report issued in European Appln. No. 19176451.3 dated Aug. 14, 2019.
(Continued)

*Primary Examiner* — Thomas H Maung
(74) *Attorney, Agent, or Firm* — ROSSI, KIMMS & McDOWELL LLP

(57) ABSTRACT

A data processing device includes: a digital signal processor; at least one processor; and at least one memory device configured to store a plurality of instructions, which when executed by the at least one processor, cause the at least one processor to operate to: output a first determination result relating to a scene of content through use of sound data; select processing for the sound data by a first selection method based on the first determination result; determine an attribute of the content from among a plurality of attribute candidates; and select the processing by a second selection method, which is different from the first selection method, based on a determination result of the attribute, wherein the digital signal processor is configured to execute the processing selected by the at least one processor on the sound data.

18 Claims, 5 Drawing Sheets

(51) Int. Cl.
*H04N 21/439* (2011.01)
*H04N 21/485* (2011.01)

(56) References Cited

U.S. PATENT DOCUMENTS

| | | |
|---|---|---|
| 2009/0304088 A1 | 12/2009 | Kodaka |
| 2010/0118212 A1 | 5/2010 | Huang |
| 2015/0142445 A1 | 5/2015 | Takahashi |
| 2017/0026017 A1* | 1/2017 | Wang ................. G10L 25/51 |
| 2017/0070817 A1 | 3/2017 | Seo |

FOREIGN PATENT DOCUMENTS

| | | |
|---|---|---|
| CN | 104023117 A | 9/2014 |
| CN | 203872212 U | 10/2014 |
| EP | 2840800 A1 | 2/2015 |
| JP | 2002159099 A | 5/2002 |
| JP | 2009296274 A | 12/2009 |
| JP | 2011013383 A | 1/2011 |
| JP | 2015099266 A | 5/2015 |
| JP | 2017054121 A | 3/2017 |
| WO | 2018155481 A1 | 8/2018 |

OTHER PUBLICATIONS

Office Action issued in Chinese Appln. No. 201910439098.3 dated Sep. 28, 2020. English machine translation provided.

Office Action issued in U.S. Appl. No. 16/418,164 dated Jul. 16, 2020.

Notice of Allowance issued in U.S. Appl. No. 16/418,164 dated Jan. 13, 2021.

Office Action issued in Japanese Appln. No. 2018-100429 dated Feb. 1, 2022. English machine translation provided.

Office Action issued in European Appln. No. 19176451.3 dated Jul. 15, 2021.

\* cited by examiner

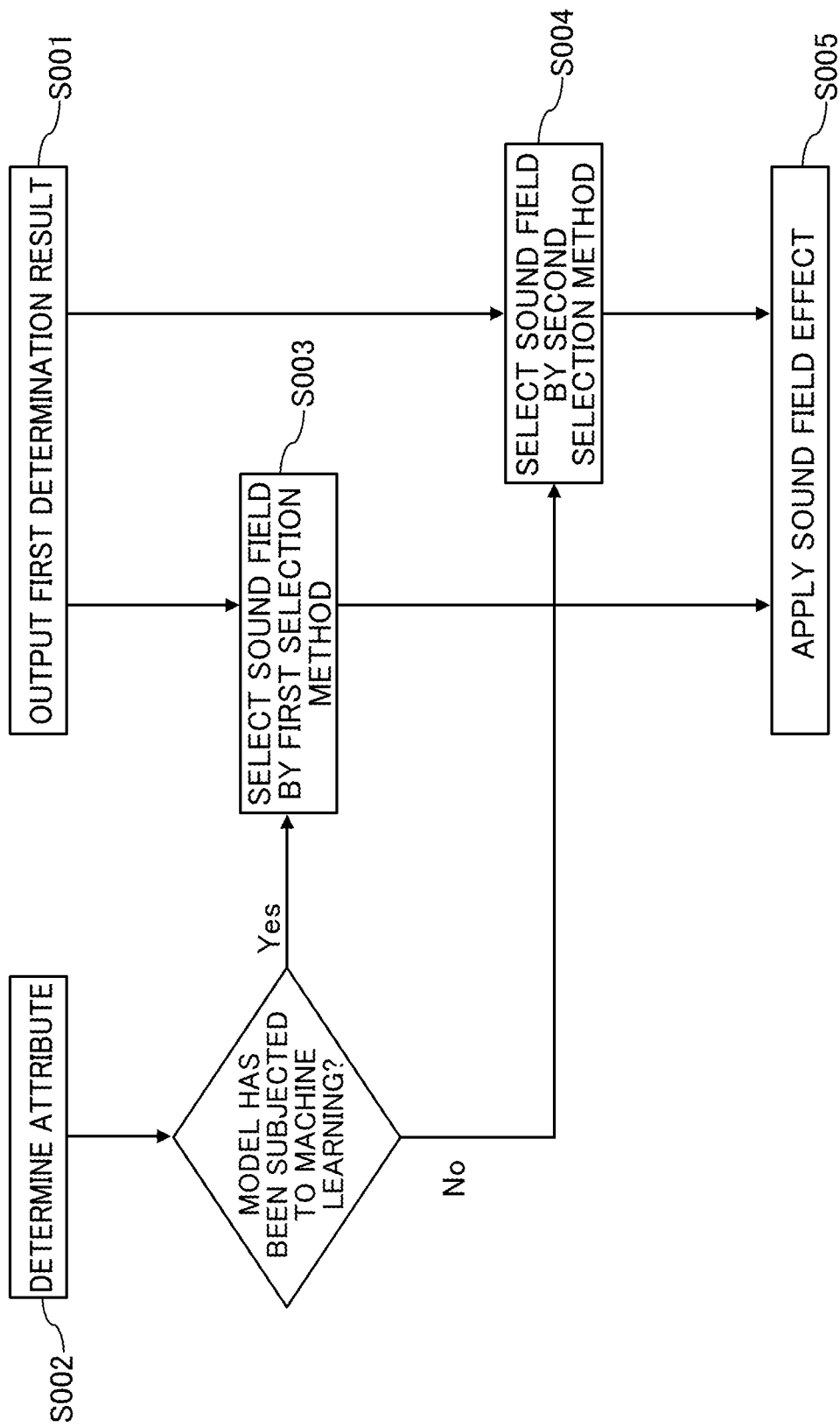

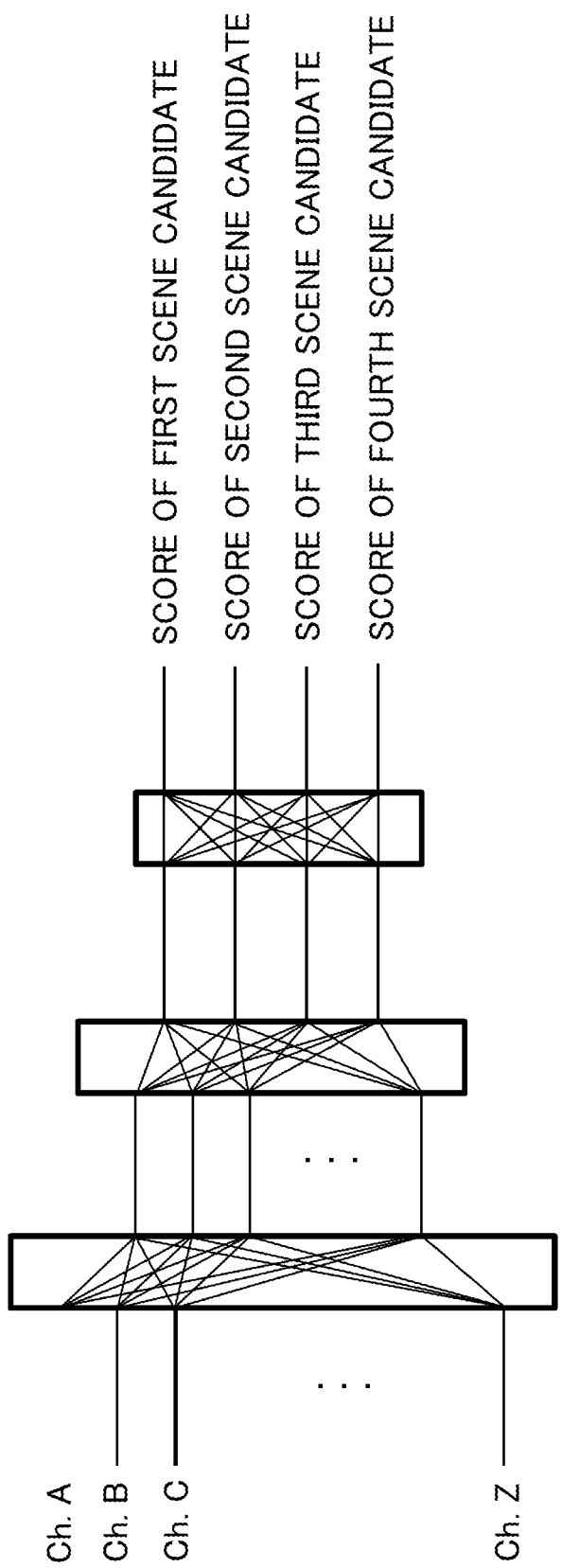

DATA PROCESSING DEVICE AND DATA PROCESSING METHOD

CROSS-REFERENCE TO RELATED APPLICATION

The present application claims priority from Japanese application JP 2018-100429 filed on May 25, 2018, the content of which is hereby incorporated by reference into this application.

BACKGROUND

1. Technical Field

The present disclosure relates to a data processing device and a data processing method.

2. Description of the Related Art

In Japanese Patent Application Laid-open No. 2009-296274, there is disclosed a video/audio signal processing device configured to determine a feature of a video scene from image data decoded by a video decoder and generate sound field control information based on the feature of the video scene.

In the above-mentioned configuration disclosed in Japanese Patent Application Laid-open No. 2009-296274, a scene of content is determined through use of image data instead of sound data, and the sound field control information is generated based on a determination result of the scene, and hence there is a problem in that relevant sound field control is not always appropriate.

SUMMARY

The present disclosure has an object to achieve a data processing device configured to determine a scene of content through use of sound data and select processing to be executed on the sound data from a determination result of the scene.

According to at least one embodiment of the present disclosure, there is provided a data processing device including: a digital signal processor; at least one processor; and at least one memory device configured to store a plurality of instructions, which when executed by the at least one processor, cause the at least one processor to operate to: output a first determination result relating to a scene of content through use of sound data; select processing for the sound data by a first selection method based on the first determination result; determine an attribute of the content from among a plurality of attribute candidates; and select the processing by a second selection method, which is different from the first selection method, based on a determination result of the attribute, wherein the digital signal processor is configured to execute the processing selected by the at least one processor on the sound data.

According to at least one embodiment of the present disclosure, there is provided a data processing method including: outputting a first determination result relating to a scene of content through use of sound data; selecting processing for the sound data by a first selection method based on the first determination result; executing the processing selected by the processing selector on the sound data; determining an attribute of the content from among a plurality of attribute candidates; and selecting the processing by a second selection method, which is different from the first selection method, based on a determination result of the attribute.

BRIEF DESCRIPTION OF THE DRAWINGS

FIG. 4 is a flow chart for illustrating a data processing method according to the first embodiment.

FIG. 5 is a conceptual diagram of a scene determination model to be used in the first embodiment.

DETAILED DESCRIPTION

First Embodiment

Figure 1:
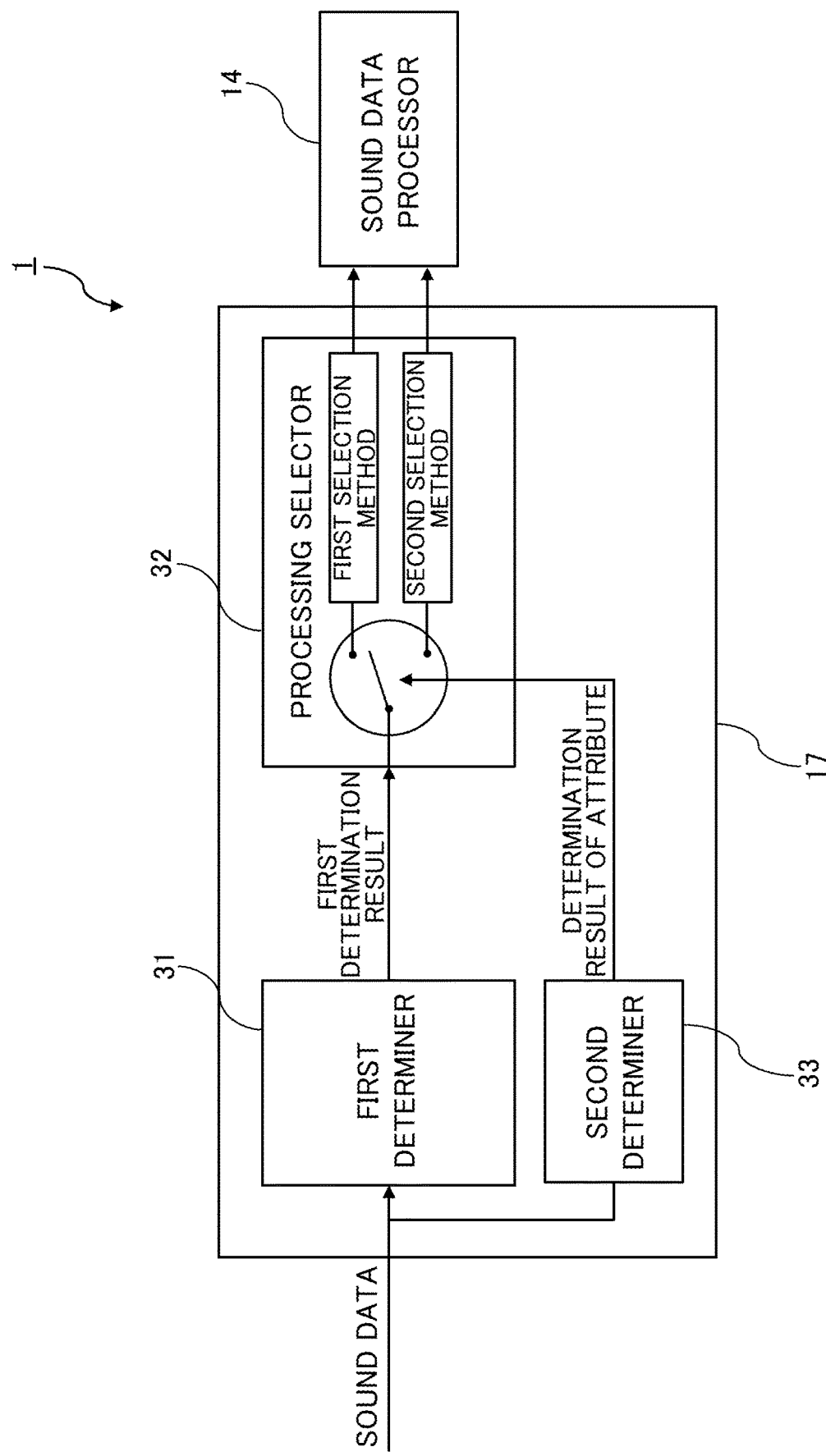
FIG. 1 is a block diagram for illustrating a functional configuration of a sound data processor and a controller in a first embodiment of the present disclosure.

A first embodiment of the present disclosure is described below with reference to the accompanying drawings.

A data processing device 1 according to the first embodiment includes a controller 17 and a sound data processor 14. The controller 17 includes a first determiner 31, a processing selector 32, and a second determiner 33.

The first determiner 31 is configured to output a first determination result relating to a scene of content through use of sound data. The second determiner 33 is configured to determine an attribute of the content from among a plurality of attribute candidates.

The processing selector 32 is configured to basically select processing (for example, sound field) by a first selection method based on the first determination result. However, the processing selector 32 is configured to select the processing by a second selection method, which is different from the first selection method, based on a determination result of the attribute obtained by the second determiner 33.

The sound data processor 14 is configured to execute the processing selected by the processing selector 32 on the sound data. For example, the sound data processor 14 applies an effect of the sound field selected by the processing selector 32 to the sound data.

With such a configuration, the data processing device 1 according to at least one embodiment of the present disclosure can determine the scene of the content through use of the sound data, and perform the processing (for example, sound field control) on the sound data from the determination result of the scene. Therefore, it is possible to perform more appropriate processing. A description is given of an exemplary case in which the content is a music video including video data in which a driving scene of a vehicle is drawn. When the video data is used to determine the scene of the content, there is a fear that such sound field control as to emphasize a frequency relating to a traveling sound of the vehicle may be adversely performed due to the driving scene of the vehicle contained in the video data. However, with the configuration of the first embodiment, even when the driving scene of the vehicle is contained in the video data, the data processing device 1 determines the scene through use of the sound data included in the music video. Therefore, it is possible to perform more appropriate sound field control.

The processing selector 32 is further configured to select the sound field by the second selection method, which is different from the first selection method, based on the determination result of the attribute obtained by the second determiner 33, to thereby be able to enable the sound field control corresponding to a plurality of attributes.

Now, a more specific configuration is described.

Figure 2:
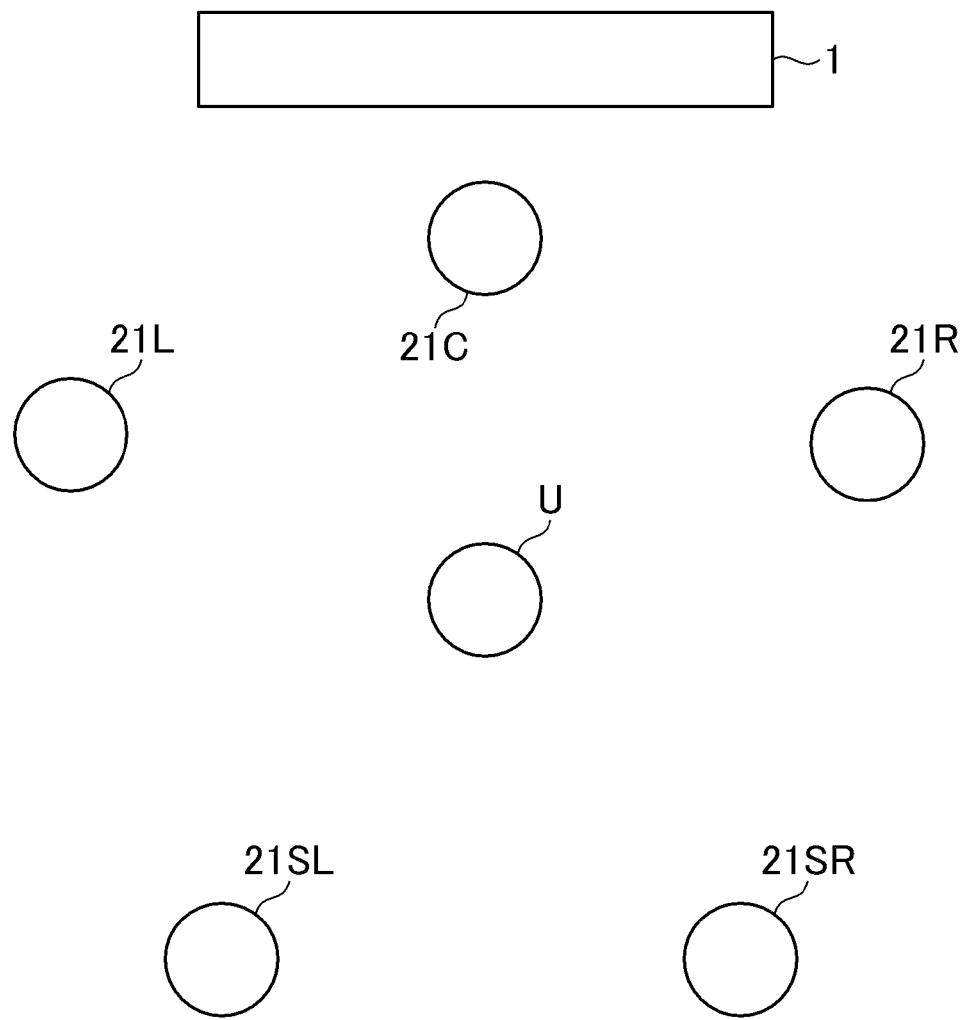
FIG. 2 is a schematic diagram for illustrating a listening environment including a data processing device according to the first embodiment.

FIG. 2 is a schematic diagram of a listening environment including the data processing device 1 according to the first embodiment. As illustrated in FIG. 2, in the first embodiment, a left front speaker 21L, a right front speaker 21R, a center speaker 21C, a left surround speaker 21SL, and a right surround speaker 215R are placed around a listening position U. The left front speaker 21L is set on the left front side of the listening position U, the right front speaker 21R is set on the right front side of the listening position U, the center speaker 21C is set at the center on the front side of the listening position U, the left surround speaker 21SL is set on the left rear side of the listening position U, and the right surround speaker 215R is set on the right rear side of the listening position U. The left front speaker 21L, the right front speaker 21R, the center speaker 21C, the left surround speaker 21SL, and the right surround speaker 215R are each connected to the data processing device 1 in a wireless or wired manner. The first embodiment is described by taking a 5-channel surround sound system as an example, but at least one embodiment of the present disclosure can also be applied to surround sound systems having various numbers of channels, for example, 2.0-channel, 5.1-channel, 7.1-channel, and 11.2-channel.

Figure 3:
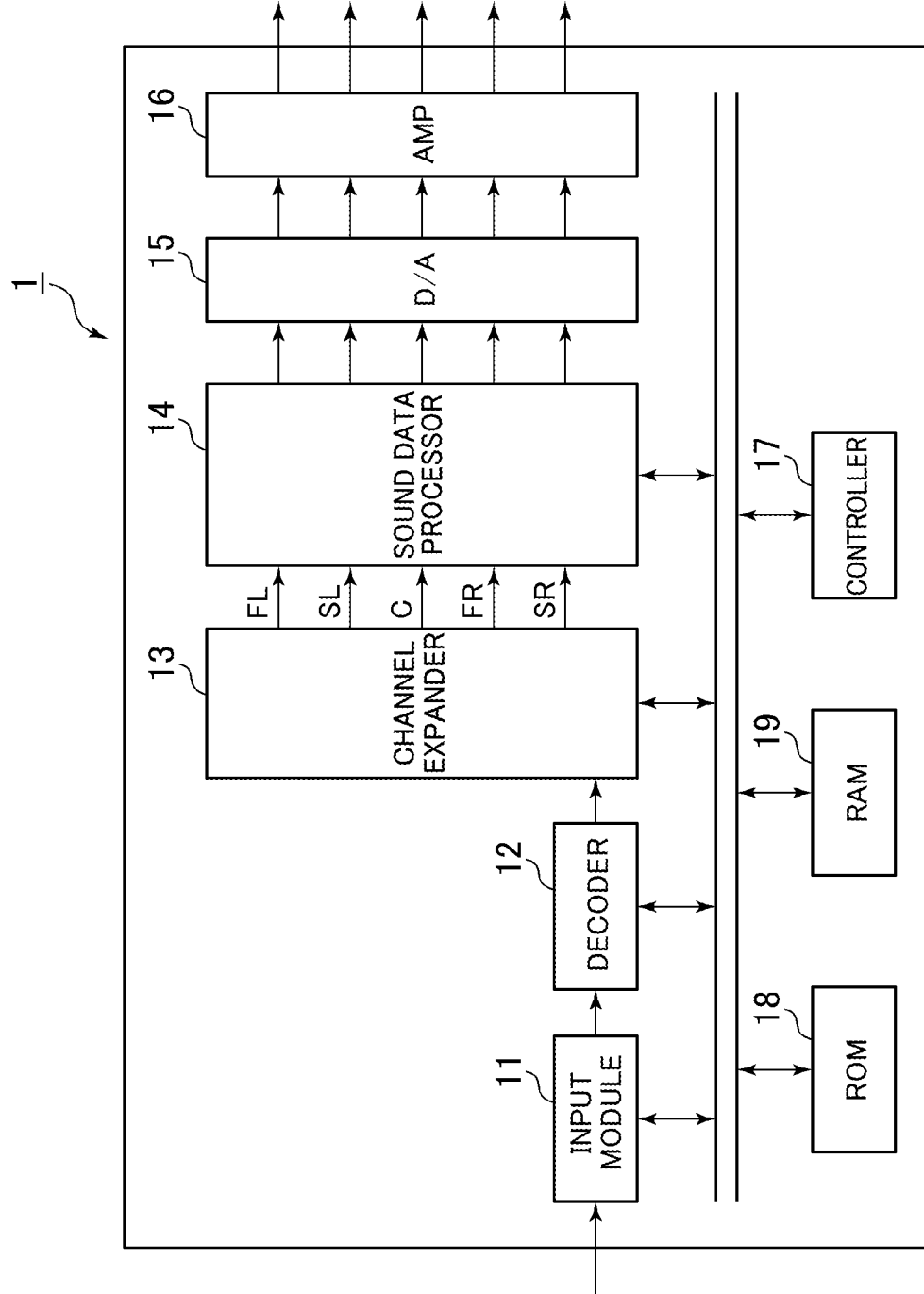
FIG. 3 is a schematic block diagram for illustrating a configuration of the data processing device according to the first embodiment.

FIG. 3 is a schematic block diagram for illustrating a configuration of the data processing device 1 according to the first embodiment. The data processing device 1 can be implemented through use of, for example, an audio processor, which is included in an AV amplifier, a personal computer, or a television receiver, or a one-bar speaker. As illustrated in FIG. 3, the data processing device 1 according to the first embodiment includes an input module 11, a decoder 12, a channel expander 13, a sound data processor 14, a D/A converter 15, an amplifier 16, a controller 17, a read-only memory (ROM) 18, a random access memory (RAM) 19.

The controller 17 is configured to read a program (firmware) for operation, which is stored in the ROM 18, into the RAM 19 to centrally control the data processing device 1. The relevant program for operation may be installed from any one of various recording media including an optical recording medium and a magnetic recording medium, or may be downloaded via the Internet.

The input module 11 is configured to acquire an audio signal via an HDMI (trademark) or a network. Examples of schemes for the audio signal include pulse code modulation (PCM), Dolby (trademark), Dolby TrueHD, Dolby Digital Plus, DOLBY ATMOS (trademark), Advanced Audio Coding (AAC) (trademark), DTS (trademark), DTS-HD (trademark) Master Audio, DTS:X (trademark), and Direct Stream Digital (DSD) (trademark), and there are no particular limitations imposed on a type of the scheme. The input module 11 outputs the sound data to the decoder 12.

In the first embodiment, the network includes a wireless local area network (LAN), a wired LAN, and a wide area network (WAN), and functions as a signal transmission path between the data processing device 1 and an optical disc player or other such source device.

The decoder 12 is formed of, for example, a digital signal processor (DSP), and is configured to decode the audio signal to extract the sound data therefrom. The first embodiment is described by handling all pieces of sound data as pieces of digital data unless otherwise specified.

The channel expander 13 is formed of, for example, a DSP, and is configured to generate pieces of sound data for a plurality of channels corresponding to the left front speaker 21L, the right front speaker 21R, the center speaker 21C, the left surround speaker 21SL, and the right surround speaker 21SR, which are described above, by channel expansion processing. As the channel expansion processing, a known technology (for example, U.S. Pat. No. 7,003,467) can be employed. The generated pieces of sound data for the respective channels are output to the sound data processor 14.

The channel expander 13 may be configured to perform the above-mentioned channel expansion processing only when original content does not include sound data on the number of channels desired by a user. That is, the channel expander 13 may be configured to output the sound data, which has been output from the decoder 12, to the sound data processor 14 as it is when the original content includes the sound data on the number of channels desired by the user. In another case, the channel expander 13 may be omitted from the data processing device 1.

The sound data processor 14 is formed of, for example, a DSP, and is configured to perform processing for adding predetermined sound field effect data to the input pieces of sound data for the respective channels based on setting performed by the controller 17.

The sound field effect data is formed of, for example, pseudo reflected sound data generated from the input sound data. The generated pseudo reflected sound data is added to the original sound data to be output.

The D/A converter 15 is configured to convert the pieces of sound data for the respective channels into analog signals.

The amplifier 16 is configured to amplify the analog signals output from the D/A converter 15, and output the amplified analog signals to the left front speaker 21L, the right front speaker 21R, the center speaker 21C, the left surround speaker 21SL, and the right surround speaker 21SR. With such a configuration, a sound obtained by adding a pseudo reflected sound to a direct sound of audio content is output from each of the speakers to form a sound field that simulates a predetermined acoustic space around the listening position U.

FIG. 1 is a block diagram for illustrating a functional configuration of the sound data processor 14 and the controller 17 in the first embodiment. The controller 17 may be formed of a single central processing unit (CPU), or may be formed of a plurality of CPUs.

In the data processing device 1 according to at least one embodiment of the present disclosure, the controller 17 includes the first determiner 31, the processing selector 32, and the second determiner 33 as described above.

FIG. 4 is a flow chart for illustrating a data processing method according to the first embodiment. The first determiner 31 outputs the first determination result relating to the scene of the content through use of the sound data acquired from the decoder 12 (Step S001). The second determiner 33 determines the attribute of the content from among the plurality of attribute candidates (Step S002). Any one of Step S001 of outputting the first determination result by the first determiner 31 and Step S002 of determining the attribute of the content by the second determiner 33 may be performed first.

In this case, there are no particular limitations imposed on the attribute of the content determined by the second determiner 33. For example, the second determiner 33 determines which one of movie, music, news, and other such attribute candidates the content is included in. As another different example, the second determiner 33 determines which one of action movie, comedy movie, and science-fiction movie, and other such attribute candidates the content is included in. As further another different example, the second determiner 33 determines which one of attribute candidates of male vocal and female vocal the content is included in.

The first embodiment is described by taking an example in which the "movie" and the "music" are employed as the attribute candidates and the second determiner 33 determines which one of those two attribute candidates the content is included in.

In the first embodiment, the first determiner 31 includes a scene determination model generated through machine learning relating only to the "movie" being a part of the attribute candidates (movie and music) to be determined by the second determiner 33. As the machine learning, for example, deep learning, a support vector machine, and other such various methods can be used. The first embodiment is described by taking an example in which the scene determination model uses the deep learning to perform machine learning.

FIG. 5 is a conceptual diagram of the scene determination model to be used in the first embodiment. The scene determination model performs machine learning on much content for training relating to movie content. As a machine learning process, for example, a scene type is manually assigned to each frame in the content for training, and the assigned scene type as well as a volume level, frequency characteristics, and other such features of each channel at that time are input as training data. In the first embodiment, first to fourth scene candidates as well as the volume level, the frequency characteristics, and other such features of each channel are input as the training data.

In the first embodiment, examples of the first to fourth scene candidates to be determined by the first determiner 31 are as follows. The first scene candidate is a battle scene or other such scene for which a spectacular sense of scale is required to be rendered. The second scene candidate is a scene with, for example, special effects, for which precise sound is required to be vividly expressed. The third scene candidate is a scene for which rendering suitable for a role-playing game or an adventure game is required. The fourth scene candidate is a scene of, for example, a drama, for which speeches are required to be emphasized. An effect of reverberating sound is applied in the sound field control performed by the sound data processor 14 with a larger degree in order from the first scene candidate to the fourth scene candidate. The first embodiment is described by taking the above-mentioned four scene candidates as an example, but as other scene candidates, for example, a "background-music-oriented scene", a "sound-effects-oriented scene", and a "bass-range-oriented scene" may be included, and contents of the scene candidate are not limited to the above-mentioned examples.

When sound data is input to the first determiner 31, determination relating to a scene is performed through use of the above-mentioned scene determination model. Then, the first determiner 31 outputs, as the first determination result, a score relating to each of the first to fourth scene candidates described above (Step S001). As a specific example, the first determiner 31 extracts a feature from the input sound data, and classifies the feature based on the scene determination model provided in advance, to thereby output a score relating to each of the first to fourth scene candidates described above (Step S001). In the first embodiment, the first determination result finally output by the first determiner 31 is normalized so that the sum of the four scores becomes one.

The first determiner 31 transmits the score relating to each of the first to fourth scene candidates described above to the processing selector 32 as the first determination result relating to the scene.

The second determiner 33 determines the attribute of the content from among the plurality of attribute candidates as described above. In the first embodiment, the "movie" and the "music" are employed as the attribute candidates and the second determiner 33 determines which one of those two attribute candidates the content is included in (Step S002).

There are no particular limitations imposed on the determination method for the attribute of the content, which is performed by the second determiner 33. Specific examples of the determination method for the attribute of the content include a frequency analysis for sound data, an analysis for video data included in content, and an analysis using title information or other such metadata included in the content.

As a first example of performing the frequency analysis on the sound data, the frequency analysis is performed by analyzing a low frequency effect (LFE) signal included in the content. A frequency band in the LFE signal is different between movie content and music content. Therefore, it is possible to analyze the LFE signal included in the sound data to determine from the frequency band used in the LFE signal which one of the movie content and the music content the input content is.

A description is given of a second example of performing the frequency analysis on the sound data. In terms of a time axis, a change of the LFE signal of the movie content is generally larger than a change of the LFE signal of the music content. Therefore, through analysis of the magnitude of a change in amplitude of the LFE signal having a plurality of frames in the sound data, it is possible to determine which one of the movie content and the music content the input content is.

The second determiner 33 transmits the determination result of the attribute of the content to the processing selector 32.

The processing selector 32 selects one sound field based on the first determination result relating to the scene, which is transmitted from the first determiner 31, and the determination result relating to the attribute, which is transmitted from the second determiner 33 (Step S003 and Step S004).

In the first embodiment, when the attribute of the content is included in the attribute candidates that have been subjected to the machine learning by the scene determination model included in the first determiner 31 (in the first embodiment, when the determination result of the attribute is the "movie"), the processing selector 32 employs the first selection method (Step S003). In contrast, when the attribute of the content is not included in the above-mentioned attribute candidates (in the first embodiment, when the determination result of the attribute is the "music"), the processing selector 32 employs the second selection method (Step S004).

First, a description is given of a case in which the second determiner 33 has determined that the attribute of the content is the "movie". The processing selector 32 selects the sound field corresponding to a scene candidate having the highest score as the "first selection method" based on the determination result obtained by the second determiner 33 (Step S003). For example, when the first scene candidate has the highest score among the scores of the respective scene candidates output from the first determiner 31, the processing selector 32 selects a sound field suitable for the battle scene or other such scene for which the rendering of a spectacular sense of scale is required.

Next, a description is given of a case in which the second determiner 33 has determined that the attribute of the content is the "music". As described above, in the first embodiment, the first determiner 31 includes the scene determination model generated through the machine learning relating only to the "movie" being a part of the attribute candidates (movie and music) to be determined by the second determiner 33. Therefore, when the attribute of the content is the "music", it is not always appropriate to select the sound field based on the scene candidate having the score of the largest value among the respective scene candidates output from the first determiner 31. For example, the music content generally includes a continuously large volume. Therefore, when the music content is subjected to parameter processing based on the scene determination model generated through the machine learning relating to the movie content, the score of the first scene candidate described above is likely to become the highest. When the processing selector 32 selects the sound field based on the first scene candidate, a sound field having sound unnecessarily reverberated too much for the music content is adversely applied by the sound data processor 14. Therefore, when the second determiner 33 has determined that the attribute of the content is the "music", the processing selector 32 selects the sound field by the second selection method, which is different from the first selection method described above (Step S004).

As a first example of the second selection method, a description is given of an example in which the processing selector 32 selects the sound field corresponding to a scene candidate having the highest score based on a plurality of scene candidates except a predetermined scene candidate. For example, it is assumed that, in the first determination result, the first scene candidate has a score of 0.5, the second scene candidate has a score of 0.3, the third scene candidate has a score of 0.1, and the fourth scene candidate has a score of 0.1. The first scene candidate is not suitable for the music content for the above-mentioned reason. Therefore, the processing selector 32 selects, as the second selection method, the sound field corresponding to the scene candidate having the highest score among the second to fourth scene candidates other than the first scene candidate. That is, in the above-mentioned example, the processing selector 32 selects the sound field corresponding to the second scene candidate.

As a second example of the second selection method, a description is given of an example in which the processing selector 32 multiplies the scores relating to the plurality of scene candidates by a coefficient depending on the determination result of the attribute. For example, the processing selector 32 may multiply the score relating to the first scene candidate that is not suitable for the music content by a coefficient (for example, 0.8 or 0) having a value smaller than 1, to thereby adjust the first scene candidate so as to have a lower score. The processing selector 32 is not always required to multiply one scene candidate by the coefficient, and may multiply all the four scene candidates by the coefficient. The processing selector 32 may again perform the normalization so that the sum of the final scores obtained by the multiplication becomes one.

As a third example of the second selection method, a description is given of an example in which the processing selector 32 selects a predetermined sound field. For example, the processing selector 32 may be configured to select the second scene candidate when the first scene candidate has the highest score in the first determination result output by the first determiner 31. In another case, the processing selector 32 may be configured to select a fifth sound field, which is different from the sound fields corresponding to the first to fourth scene candidates, when the determination result of the attribute obtained by the second determiner 33 is the "music".

The description of each of the above-mentioned examples is based on the example in which the scene determination model of the first determiner 31 uses the deep learning as the machine learning, but the scene determination model of the first determiner 31 may be configured to use a support vector machine for multiclass classification as the machine learning. For example, in order to classify sound data into N scene candidates, N–1 support vector machines are combined for classification of classes. In the above-mentioned example, the scene determination model includes three support vector machines in order to perform classification relating to four scene candidates. For example, a first support vector machine first determines whether or not the input sound data relates to the first scene candidate. When the sound data does not relate to the first scene candidate, a second support vector machine determines whether or not the sound data relates to the second scene candidate. When the sound data does not relate to the second scene candidate, a third support vector machine determines whether or not the sound data relates to the third scene candidate. When the sound data does not relate to the third scene candidate, it is determined that the sound data relates to the fourth scene candidate.

When the scene determination model that has performed the machine learning using the support vector machine for multiclass classification is used, the first determiner 31 illustrated in FIG. 1 outputs one scene candidate out of the first to fourth scene candidates as the first determination result.

When the processing selector 32 selects the sound field by the first selection method based on the determination result of the attribute obtained by the second determiner 33, the processing selector 32 selects the sound field based on one scene candidate being the first determination result output by the first determiner 31. The first embodiment is described by taking an example of selecting a sound field effect to be applied to sound data as an example in which the processing selector 32 selects the processing to be performed on the sound data, but at least one embodiment of the present disclosure is not limited thereto. Other examples in which the processing selector 32 selects the processing to be performed on the sound data include the selection of the setting of an equalizer and the selection of a gain ratio, a delay time, and other such parameters of each channel.

Meanwhile, a description is given of a case in which the processing selector 32 selects the predetermined sound field by the second selection method based on the determination result of the attribute obtained by the second determiner 33. For example, the processing selector 32 may be configured to select, for example, the second scene candidate when the first determiner 31 outputs the "first scene candidate" as the first determination result. In another case, the processing selector 32 may be configured to select the fifth sound field, which is different from the sound fields corresponding to the first to fourth scene candidates, when the determination result of the attribute obtained by the second determiner 33 is the "music".

The processing selector 32 outputs a command signal based on a sound field selection result to the sound data processor 14. The command signal includes an instruction relating to the setting of different kinds of sound field parameters to be used for the arithmetic operation processing by the sound data processor 14. The sound field parameters include, for example, the gain ratio, the filter coefficient, and the delay time of each channel. The sound data processor 14 changes the sound field parameter based on the command signal, to thereby perform processing for applying predetermined sound field effect data to the input sound data on each channel (Step S005).

With such a configuration, the first determination result relating to the scene, which is obtained by the first determiner 31, can be used for a plurality of pieces of sound data having a plurality of content attributes. In other words, according to the above-mentioned configuration, there is an advantage that the first determiner 31 is not required to perform such scene determination as to cover all attributes of content. Therefore, as the scene determination model included in the first determiner 31, it is possible to use a model generated through machine learning relating only to a part of the plurality of attribute candidates. This allows reduction in the amount of machine learning to be performed on the scene determination model. In addition, it is possible to implement a configuration that suffices as long as the scores relating to a limited number of scene candidates are output as the first determination result output by the first determiner 31.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A data processing device, comprising:
a digital signal processor;
at least one processor; and
at least one memory device configured to store a plurality of instructions, which when executed by the at least one processor, cause the at least one processor to operate to:
obtain, based on a video scene determination model generated through a machine learning process relating to a first attribute among a plurality of attribute candidates but not to a second attribute among the plurality of attribute candidates, a first determination result relating to a video scene included in a content through use of sound data associated with the video scene;
determine an attribute of the content, in which the video scene is included, from among the plurality of attribute candidates;
select processing to be applied to the sound data associated with the video scene using a first selection method, which selects the processing to be applied to the sound data from among a plurality of processing candidates respectively corresponding to a plurality of video scene candidates, in a first case where the determined attribute of the content is the first attribute among the plurality of attribute candidates; and
select processing to be applied to the sound data associated with the video scene using a second selection method, which selects the processing to be applied to the sound data from among the plurality of processing candidates respectively corresponding to the plurality of video scene candidates and which differs from the first selection method, in a second case where the determined attribute of the content is the second attribute among the plurality of attribute candidates different from the first attribute,
wherein the digital signal processor is configured to execute the selected processing for the sound data associated with the video scene on the sound data.

2. The data processing device according to claim 1, wherein the at least one processor operates to:
obtain the first determination result comprising a score for each of the plurality of video scene candidates,
multiply the score for each of the plurality of video scene candidates by a coefficient in the second case where the determined attribute of the content is the second attribute, and
select the processing to be applied to the sound data associated with the video scene based on the scores multiplied by the coefficient, in the second selection method.

3. The data processing device according to claim 1, wherein the at least one processor operates to:
obtain the first determination result comprising a score for each of the plurality of video scene candidates, and
(iii) select a processing corresponding to a second video scene candidate among the plurality of video scene candidates when a first video scene candidate among the plurality of video scene candidates has the highest score in the first determination result, or (iv) select a processing, which is different from the plurality of processing candidates respectively corresponding to the plurality of video scene candidates, in the second selection method.

4. The data processing device according to claim 1, wherein
the plurality of instructions cause the at least one processor to output the first determination result based on a video scene determination model generated through machine learning relating only to a part of the plurality of attribute candidates.

5. The data processing device according to claim 4, wherein the plurality of instructions cause the at least one processor to extract a feature from the sound data associated with the video scene, and perform classification based on the video scene determination model, to thereby output a score relating to each of a plurality of video scene candidates as the first determination result.

6. The data processing device according to claim 5, wherein the plurality of instructions cause the at least one processor to select, in the second selection method, processing corresponding to one of the plurality of video scene candidates that has a highest score among the plurality of video scene candidates except a predetermined video scene candidate is not selected even in a case where the predetermined video scene candidate has the highest score.

7. The data processing device according to claim 5, wherein the plurality of instructions cause the at least one processor to multiply, in the second selection method, the score relating to each of the plurality of video scene candidates by a coefficient.

8. The data processing device according to claim 1, wherein the plurality of instructions cause the at least one processor to select, in the second selection method, predetermined processing.

9. The data processing device according to claim 1, wherein the plurality of instructions cause the at least one processor to select a sound field as the processing for the sound data associated with the video scene, and wherein the digital signal processor is configured to apply an effect of the sound field selected by the at least one processor to the sound data associated with the video scene.

10. A data processing method, comprising:
obtaining, (i) with at least one processor operating with at least one memory device in a device and (ii) based on a video scene determination model generated through a machine learning process relating to a first attribute among a plurality of attribute candidates but not to a second attribute among the plurality of attribute candidates, a first determination result relating to a video scene included in a content through use of sound data associated with the video scene;
determining, with the at least one processor operating with the at least one memory device in the device, an attribute of the content, in which the video scene is included, from among the plurality of attribute candidates;
selecting, with the at least one processor operating with the at least one memory device in the device, processing to be applied to the sound data associated with the video scene using a first selection method, which selects the processing to be applied to the sound data from among a plurality of processing candidates respectively corresponding to a plurality of video scene candidates, in a first case where the determined attribute of the content is the first attribute among the plurality of attribute candidates;
selecting, with the at least one processor operating with the at least one memory device in the device, processing to be applied to the sound data associated with the video scene using a second selection method, which selects the processing to be applied to the sound data from among the plurality of processing candidates respectively corresponding to the plurality of video scene candidates and which differs from the first selection method, in a second case where the determined attribute of the content is the second attribute among the plurality of attribute candidates different from the first attribute; and
executing the selected processing for the sound data associated with the video scene on the sound data.

11. The data processing method according to claim 10, further comprising:
obtaining the first determination result comprising a score for each of the plurality of video scene candidates,
multiplying the score for each of the plurality of video scene candidates by a coefficient in the second case where the determined attribute of the content is the second attribute, and
selecting the processing to be applied to the sound data associated with the video scene based on the scores multiplied by the coefficient, in the second selection method.

12. The data processing method according to claim 10, further comprising:
obtaining the first determination result comprising a score for each of the plurality of video scene candidates, and
(iii) selecting a processing corresponding to a second video scene candidate among the plurality of video scene candidates when a first video scene candidate among the plurality of video scene candidates has the highest score in the first determination result, or (iv) selecting a processing, which is different from the plurality of processing candidates respectively corresponding to the plurality of video scene candidates, in the second selection method.

13. The data processing method according to claim 10, further comprising outputting, with the at least one processor operating with the at least one memory device in the device, the first determination result based on a video scene determination model generated through machine learning relating only to a part of the plurality of attribute candidates.

14. The data processing method according to claim 13, further comprising extracting, with the at least one processor operating with the at least one memory device in the device, a feature from the sound data associated with the video scene, and performing classification based on the video scene determination model, to thereby output a score relating to each of a plurality of video scene candidates as the first determination result.

15. The data processing method according to claim 14, further comprising selecting, with the at least one processor operating with the at least one memory device in the device, in the second selection method, processing corresponding to one of the plurality of video scene candidates that has a highest score among the plurality of video scene candidates except a predetermined video scene candidate is not selected even in a case where the predetermined video scene candidate has the highest score.

16. The data processing method according to claim 14, further comprising multiplying, with the at least one processor operating with the at least one memory device in the device, in the second selection method, the score relating to each of the plurality of video scene candidates by a coefficient.

17. The data processing method according to claim 10, further comprising selecting, with the at least one processor operating with the at least one memory device in the device, in the second selection method, predetermined processing.

18. The data processing method according to claim 10, further comprising:
selecting, with the at least one processor operating with the at least one memory device in the device, a sound field as the processing for the sound data associated with the video scene; and
applying, with the at least one processor operating with the at least one memory device in the device, an effect of the selected sound field to the sound data associated with the video scene.

* * * * *